UNITED STATES PATENT OFFICE.

RAMÓN BONASTRE LLOPART, OF CORDOBA, ARGENTINA.

PRODUCTION OF ZINC SULFATE.

1,140,354.          Specification of Letters Patent.          Patented May 25, 1915.

No Drawing.          Application filed March 16, 1915. Serial No. 14,777.

*To all whom it may concern:*

Be it known that I, RAMÓN BONASTRE LLOPART, a subject of the King of Spain, residing at Cordoba, Province of Cordoba, Argentina, have invented a new and useful Improvement in the Production of Zinc Sulfate; and I do hereby declare the following to be a full, clear, and exact description of the same.

This invention relates to an inalterable white product for painting and other purposes, formed on a base of zinc sulfid and barium sulfate, and relates more particularly to matter divided from my co-pending application, Serial No. 9300, filed Feb. 19, 1915.

By combining water solutions of zinc sulfate and barium sulfid, an equimolecular precipitate of zinc sulfid and barium sulfate is obtained. When by means of the usual processes sulfid of zinc is extracted either alone or combined with salts of barium, calcium, strontium and the like, an industrial product similar to the above precipitate is obtained. These products are generally used in connection with the manufacture of rubber goods, celluloid, wax cloth, the like, and painting. When employed for painting, particularly when mixed with dye-stuffs or pigments from other salts, and diluted with raw or boiled oil or varnish, they are subject to darkening change of color or phosphorescences, especially if mixed with varnish, boiled oil or pigments of salts of metals other than zinc. This darkening, change of color, or phosphorescences are caused by the presence of other metals such as manganese, bismuth, cobalt, iron, copper, antimony, nickel and the like, and give rise to a kind of efflorescence with the result that the paint falls off sooner or later after having been applied. These disadvantages have prevented an advantageous or rational employment of paints of the above mentioned bases on places exposed to sun-light or less powerful light, and on places subject to varying atmospheric conditions.

The object of the present invention is to overcome these disadvantages and to provide a stable white product absolutely inalterable under the influence of light and atmospheric and other conditions, and while keeping all of these properties is adapted to be mixed with any color pigment, varnish or raw or boiled oil of the kind usually used for painting. This inalterable white product consists of equimolecular precipitates of zinc sulfid and barium sulfate subsequently treated as herein described and precipitated by the reaction upon each other of zinc sulfate and barium sulfid, as will be explained.

Further objects are to provide a simple and efficient process comprising novel steps for manufacturing this process.

The new process is in substance as follows: Zinc blende, or zinc blende and other substances is roasted in such a manner that zinc sulfate and other substances are produced. This mixture is agitated in water preferably hot, and the resulting water solution of zinc sulfate is decanted and then submitted to the action of oxygen from the air and dioxids under the influence of heat. This is accomplished by mixing the zinc sulfate solution with dioxid (*e. g.* barium dioxid or lead dioxid) and water heated by steam to about 100° C. at the same time passing bubbles of air therethrough. The resultant is a pure stable sulfate of zinc in water solution, which is then passed through a filter press to free it of foreign matter.

The barium sulfid is obtained from the ores by known processes and a water solution thereof prepared by stirring in hot water. The water solutions of zinc sulfate and barium sulfid are mixed in a large tank and react upon each other and produce a precipitate containing barium sulfate and entirely pure stable zinc sulfid. This precipitate is pressed in a filter press and then dried. The dried product is then calcined in a hermetically closed muffle of known construction provided with a water seal or other form of seal to permit the escape of the vapors driven off, at the same time preventing the ingress of air. This calcining is carried on at a temperature of about 500 to 700° C. and drives off the water of composition but does not decompose the substances as in known process wherein air is admitted or a high temperature used. After calcining the lithopone product is immediately cooled off by immersing in cold water, changing the water until the product is entirely cooled, reducing the calcined product to paste form after which it is ground, washed in water, heated to about 80 to 100° C., again pressed in a filter press, and afterward rapidly dried at a heat less than 100° C. which reduces the lithopone to a more or less powder form after which it is finished by passing it through the usual disintegrator. If instead of the powder, the paste form is desired after washing and heating to 80° to 100° C. and pressing in the filter press as above described, the pressed product is passed through the usual emulsifier which presses out the water and substitutes oil. The emulsion is then ground by passing between cylinders as is well known. This product is entirely neutral and stable and is permanently white and does not combine with substances producing discoloration or decomposition or efflorescence. This product, either alone or mixed with other ingredients, such as lead, anilin, etc., or mixed with raw or boiled oil or with varnish, or any material usually used in painting, will not, when submitted to action of the atmosphere or light, show any alteration of color nor decompose to any extent.

I claim as my invention:—

1. A step in the herein described process of preparing an inalterable white product, said step consisting in treating a water solution of zinc sulfate with bioxids, air bubbles, and injections of steam.

2. A step in the herein described process of preparing an inalterable white product, said step consisting in treating a water solution of zinc sulfate with an oxidizing agent and air bubbles.

3. A step in the herein described process of preparing an inalterable white product, said step consisting in treating a water solution of zinc sulfate with an oxidizing agent, air bubbles and steam.

4. A step in the herein described process of preparing an inalterable white product, said step consisting in treating a water solution of zinc sulfate with an oxidizing agent, air bubbles and heat.

5. A step in the herein described process of preparing an inalterable white product, said step consisting in treating a water solution of zinc sulfate with an oxidizing agent and heat.

In testimony whereof, I have signed my name to this specification in the presence of two subscribing witnesses.

RAMÓN BONASTRE LLOPART.

Witnesses:
FRANK H. LOGAN,
M. VANCORBIR.